250-506.1 SR

XR 4,023,615

United States 4,023,615

Reese May 17, 1977

[54] VEHICLE FOR TRANSPORTING CONTAINER FOR MATERIALS THAT NEED TO BE HANDLED WITH CARE

[76] Inventor: Stanton L. Reese, 11409 Duryea Drive, Potomac, Md. 20854

[22] Filed: Jan. 18, 1973

[21] Appl. No.: 324,576

Related U.S. Application Data

[63] Continuation-in-part of Ser. No. 109,925, Jan. 26, 1971, Pat. No. 3,727,059.

[52] U.S. Cl. .................................... 165/41; 165/80; 105/366 R; 105/367; 105/464; 296/35 A; 280/179 R; 250/506

[51] Int. Cl.² .......................................... B60P 3/00

[58] Field of Search .............. 296/1 R, 3, 25, 35 A, 296/28 M; 280/5 C, 5 D, 5 E, 179 R; 165/185, 41, 80; 105/366 R, 367, 464; 250/506

[56] References Cited

UNITED STATES PATENTS

| | | | |
|---|---|---|---|
| 3,095,212 | 6/1963 | Gilbert | 280/179 R X |
| 3,133,197 | 5/1964 | Allen | 250/506 X |
| 3,578,348 | 5/1971 | Reinke | 280/5 E |

FOREIGN PATENTS OR APPLICATIONS

| | | | |
|---|---|---|---|
| 1,264,037 | 5/1961 | France | 250/506 |
| 462,361 | 7/1928 | Germany | 105/367 |
| 100,844 | 8/1923 | Switzerland | 105/367 |

*Primary Examiner*—L. J. Papemer
*Attorney, Agent, or Firm*—Fleit & Jacobson

[57] ABSTRACT

A vehicle for transporting materials that need to be handled with care, for example a container as described in U.S. Pat. No. 3,727,059 which utilizes a removable system of heat conducting fins made of a light weight highly heat conductive metal, such as aluminum or aluminum alloys. The vehicle construction permits a substantial reduction in the weight of the container during transport. The vehicle utilizes only a pair of horizontal side beams interconnecting a pair of yoke members to support the container and provide the necessary strength and safety with a minimum of weight.

12 Claims, 8 Drawing Figures

Fig. 3
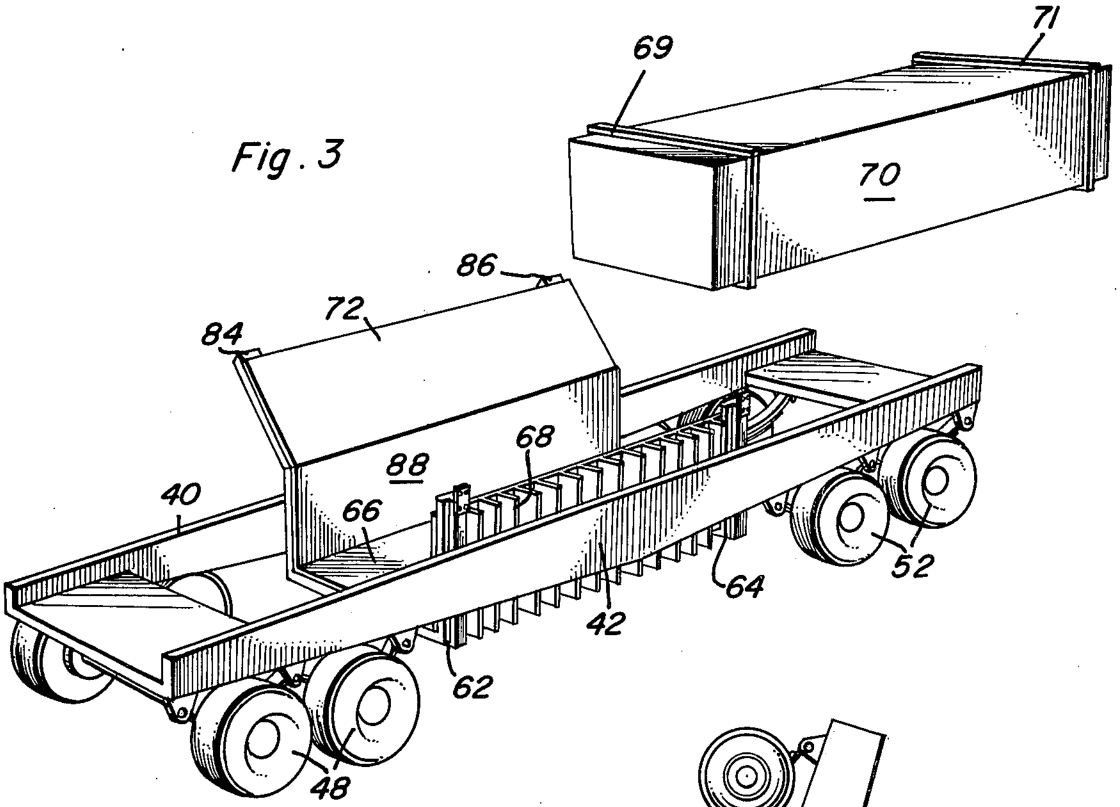
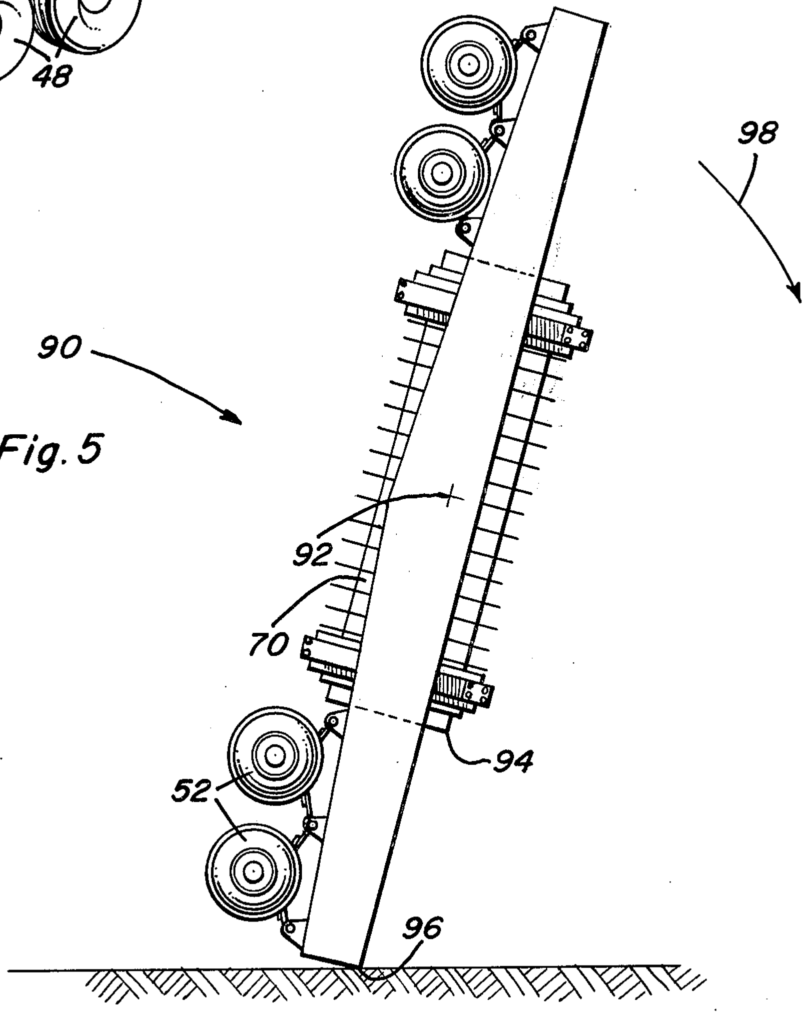
Fig. 5

VEHICLE FOR TRANSPORTING CONTAINER FOR MATERIALS THAT NEED TO BE HANDLED WITH CARE

This is a continuation-in-part of my earlier copending application, Ser. No. 109,925 filed Jan. 26, 1971, now U.S. Pat. No. 3,727,059, which disclosure is incoporated herein by reference as if fully set forth.

The present invention relates to a vehicular construction which permits the transportation of containers for materials that need to be handled with care, for example, the container of my said earlier copending application, now U.S. Pat. No. 3,727,059 with maximum strength characteristics and minimum weight. It is, accordingly, the object of the present invention to provide a vehicle for transporting containers as described which has a maximum strength and design characteristic to protect the container and its contents in the event of accident but which has a minimum of weight.

SUMMARY OF THE INVENTION:

In accordance with the present invention, this object is achieved by providing a vehicular design in which the vehicle itself serves as a major protective structure to protect the container in the event of an accident. Thus, the additional supporting structure usually employed in prior art containers for insuring that the containers can withstand tremendous impacts need not be employed. For this reason, the weight of the container/transport vehicle combination as a whole can be significantly reduced, while not comprising the strength or structural integrity of the container, or alternatively, more payload can be carried in a single transport vehicle of legal weight.

BRIEF DESCRIPTION OF THE DRAWINGS:

For the purpose of illustrating the foregoing objects and advantages attendant this invention, preferred and illustrative embodiments of the invented vehicular structure, will hereinafter be described with reference being had to the accompanying drawings forming a part hereof, wherein like numerals refer to like parts throughout, and in which:

FIG. 3 is a perspective view of the vehicle and container illustrated in FIG. 1 showing how the container is inserted into and removed from the inventive vehicle.

FIGS. 5 and 6 illustrate the container/vehicle assembly before it reaches the ground from a vertical fall;

Figure 1:
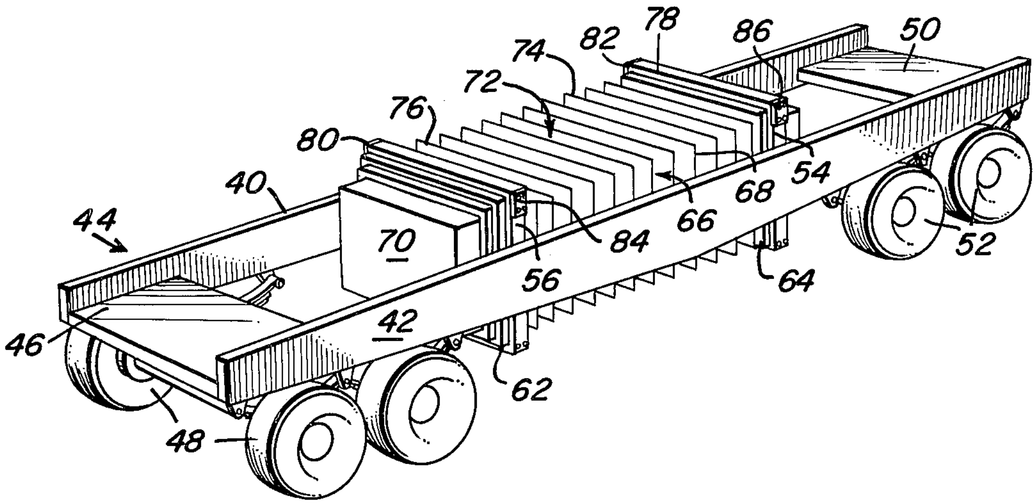
FIG. 1 is a perspective view of the inventive vehicle in accordance with the present invention designed to carry a smooth wall container.

DETAILED DESCRIPTION OF THE DRAWINGS:

Referring now specifically to FIG. 1, the inventive transportation vehicle takes the form of longitudinally extending beams 40 and 42 which are spaced apart from one another and parallel and form the side structure of the inventive vehicle. Preferably, each of beams 40 and 42 is made stronger in its central portion, although other beam constructions can be employed. Located at the forward end 44 of the inventive vehicle is a wheel carriage assembly 46 which carries preferably two sets of wheels 48 in a known fashion. Likewise, a wheel carriage 50 attached to the rear end of the inventive vehicle carries a double set of wheels 52 also in a known fashion. If the inventive vehicle is to be employed as a railroad car, wheels 48 and 52 are, of course, railroad wheels. Likewise, if the inventive vehicle is to be a truck, for example, wheels 48 and 52 are tires.

Figure 2:
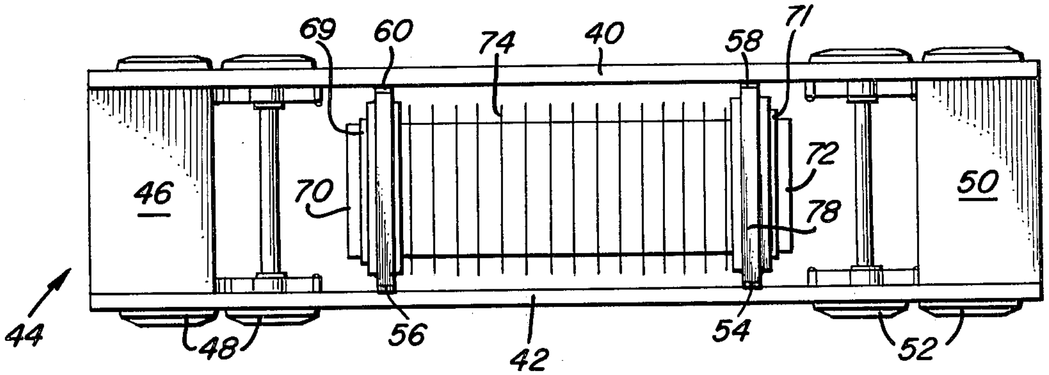
FIG. 2 is a plan view of the vehicle and container shown in FIG. 1.
Figure 4:
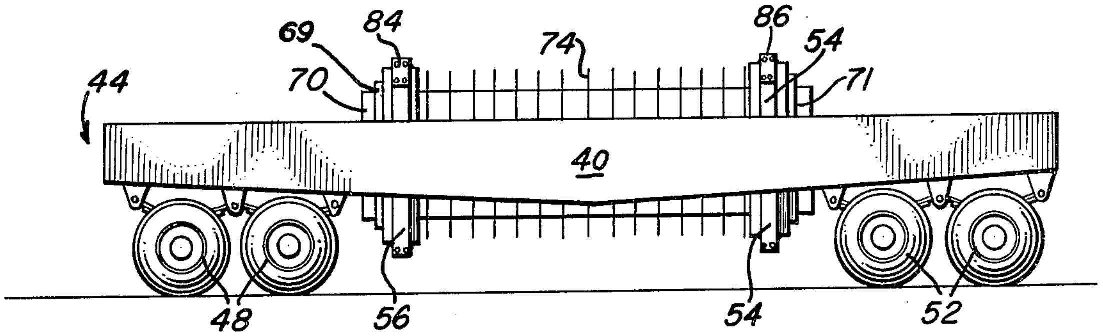
FIG. 4 is a side view of the vehicle and container shown in FIG. 1.

Secured to the inside of longitudinal beam 42 are two vertically positioned supports 54 and 56. In a similar manner, vertically extending supports 58 and 60 are secured to the inside of longitudinal beam 40 (FIG. 2). A horizontal member 62 connects the bottom of vertical support 56 with the bottom of vertical support 60, while another horizontal member 64 connects the bottom of vertical support 54 with the bottom of vertical support 58. In a similar manner, locking arm 76 connects the top of vertical support 56 with the top of vertical support 60, while locking arm 78 connects the top of vertical support 54 with the top of vertical support 58. As shown in FIGS. 1 and 4, these various horizontal and vertical members, supports and arms together, define two rectangular yokes, hereinafter referred to as yoke 79 and yoke 81, which are provided for a purpose more fully set forth hereinafter.

Resting inside or fixed to vertical supports 54 and 56, horizontal members 62 and 64 and vertical supports 58 and 60 are base plates 66 which carry fins 68 rigidly fixed thereto.

Resting in and extending slightly beyond the trough-shaped space 88 (FIG. 3) defined by the three base plates 66 is a smooth-wall container 70 such as that disclosed in FIG. 1 of my said prior co-pending application, now U.S. Pat. No. 3,727,059. As shown in FIGS. 1–4, the container 70 is provided with collar 69 located near its forward end and collar 71 located near its rearward end. These collars are adapted to securely rest against the outside edges of yokes 79 and 81, respectively, when the container 70 is carried by the inventive vehicle and to thereby serve as positive stops preventing container 70 from sliding in trough-shaped space 88.

When the container 70 is seated in the inventive vehicle, base plates 66 are firmly secured to the outer walls of the container. As discussed in my said prior co-pending application, now U.S. Pat. No. 3,727,059 intimately contacting the fin-carrying base plates to the container outer walls in this manner maximizes heat transfer from the interior of the radioactive materials container to the atmosphere if such is desired.

Figure 6:
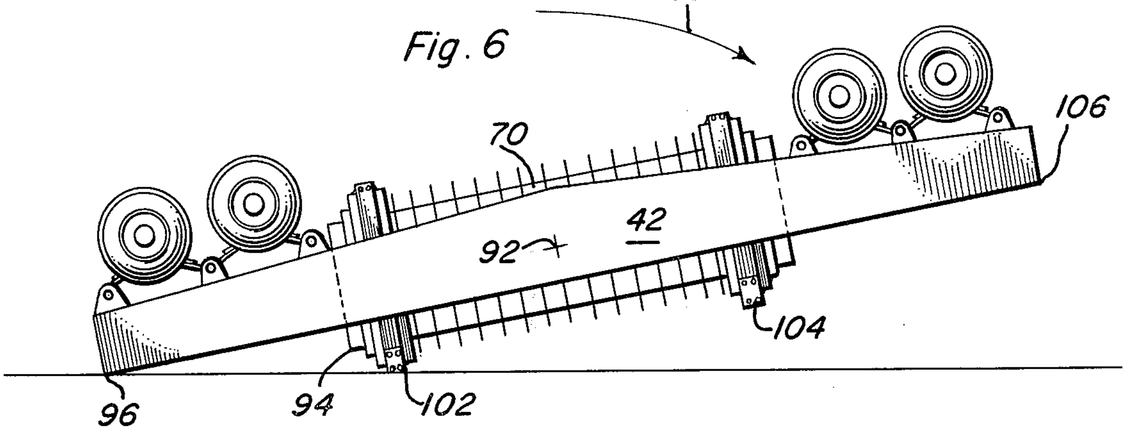

Extending across the top of the container 70 is a fourth base plate 72. Like the other base plates 66, base plate 72 also carries a system of fins 74 and is positioned in intimate contact with the outer surface of the materials container so that heat transfer to the atmosphere is maximized. Securely fixed to the ends of base plate 72 are locking arms 76 and 78, which are pivotally mounted at ends 80 and 82 respectively to the tops of horizontal support members 60 and 58 respectively and are further secured at their other ends by locking means 84 and 86 to the tops of horizontal support members 56 and 54 respectively. With this construction, and as illustrated in FIG. 6, the upper base plate 72 can be lifted off the container 70 and the container 70 removed from the inventive vehicle by simply lifting it out of trough-shaped space 88. Thereafter, container 70 can be reseated in the inventive vehicle by simply placing it back into the trough-shaped space 88 with collars 69 and 71 longitudinally outside yokes 79 and 81 respectively, pivoting base plate 72 back down onto the top of container 70 and locking means 84 and 86.

When the inventive container/vehicle assembly is assembled as in FIGS. 1, 2 and 4, the structural integrity of container 70 is substantially completely insured, notwithstanding the great impact forces that might be created should the assembly become involved in an accident, such as a free fall or the like. In this regard, it should be appreciated that the portion of a container most likely to be damaged from an impact force is the container corners and edges since they offer the last surface area to absorb impact energy. Moreover, when the container falls on its corner in such a way that the center of gravity of the container assembly is vertically exactly above the corner, the stress placed on the corner is at its greatest, since the center of gravity acts directly through the corner. With these considerations in mind, it can be seen that the inventive container/-vehicle assembly minimizes impact forces on the structurally weak portions of the container.

In particular, as shown in FIG. 4, the inventive vehicle is so designed that the corners and edges of the container 70 will not contact the ground should the container/vehicle assembly be subjected to a free fall. On the contrary, regardless of the configuration of the container/vehicle assembly as it contacts the ground, a portion of the vehicle structure and not the container corners or edges will contact the ground first. This prevents the large impact forces generated from the fall from acting directly on the relatively weak container corners and edges and thus minimizes the risk of container damage as a result of a freefall. The container/-vehicle assembly is designed to be capable of withstanding an impact equal to a free-fall of at least 30 feet without rupture of the container.

Referring in particular to FIG. 5, the inventive container/vehicle assembly, indicated generally at 90, is shown at the instant it contacts the ground after a free fall in which the center of gravity 92 of the container/-vehicle assembly is vertically exactly above a corner 94 of the container 70. As indicated above, if an ordinary container without the vehicular assembly of the instant invention were to be subjected to this type of fall, the impact force exerted on corner 94 would be extremely great. However, with the inventive assembly, before corner 94 reaches the ground, transport corner 96 of the inventive transport device contacts the ground, thereby enabling the transport frame to absorb and evenly distribute much of the kinetic energy arising from the fall. Moreover, because center of gravity 92 is somewhat to the left of corner 96 as shown in FIG. 5, the container/vehicle assembly begins to immediately rotate about transport corner 96 in the direction of arrow 98 and therefore a portion of the energy created by the fall is transformed into rotational momentum.

Referring to FIG. 6, the container/transport assembly continues to rotate in the direction of arrow 98 until the corner 102 of the transport assembly, which is defined by the horizontal locking arm 78, makes contact with the ground. At this time, still further energy arising from the fall of the container/transport is absorbed by the structural members of the transport. Specifically, because the corner 94 of the container 70 is still significantly above the ground when the assembly is in this configuration, impact forces are kept away from the relatively weak corners of the container itself. Consequently, structural damage to the container is minimized.

Because the center of gravity 92 of the container/transport assembly is still to left of transport corner 102 when the assembly is in the configuration shown in FIG. 6, and further because the assembly has generated significant rotational momentum, the assembly continues to rotate in the direction of arrow 98. As a consequence of this rotation, transport corner 104, which is defined by locking arm 76, comes into contact with the ground, thereby causing more of the energy from the fall to be absorbed by the inventive transport assembly. If the assembly still contains significant rotational momentum after this contact, it will continue to rotate in the direction of arrow 98 until transport corner 106 contacts the ground and still more fall energy is absorbed. After contact of corner 106 with the ground, the assembly will rotate in the opposite direction and this rotation will continue until all the energy at impact is absorbed.

As indicated above, the major advantage provided by the inventive container and vehicle construction is that complex and massive support structure is eliminated. This advantageous result is accomplished because the structure of the vehicle transport of the instant invention, namely longitudinal beams 40 and 42, as well as yokes 79 and 81, also serve as the protecting structure for the container. Thus, a single support structure is employed both as the vehicle structure and as the container superstructure. For this reason, the overall weight of the container/vehicle assembly is markedly reduced compared with prior art systems capable of handling comparable payloads. Consequently, larger payloads can be transported by the inventive container/transport assembly than prior art assemblies of comparable weight.

Although the foregoing description has specifically shown the inventive transport assembly to be equipped with a base plate and fin assembly for improving heat transfer between the interior of the smooth-walled container and the atmosphere, it should be appreciated that such a fin assembly need not be present if unnecessary. Thus, one embodiment of the present invention contemplates that the inventive transport vehicle be made to receive the smooth-walled container within its structure but without the fin asssembly shown in FIGS. 1 to 6.

Figure 7:
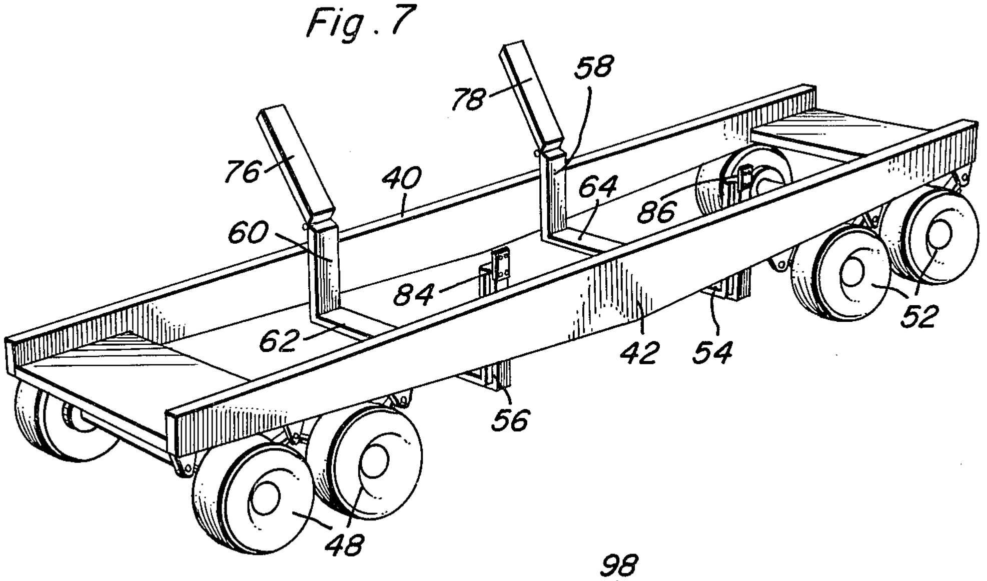
FIG. 7 illustrates another embodiment of the inventive vehicle.

Referring now to FIG. 7, an inventive transport vehicle for handling a smooth-walled container, such as the one shown in FIG. 1 of my said prior co-pending application, now U.S. Pat. No. 3,727,059, is constructed much in the same way as the transport vehicle shown in FIG. 1 herein and includes longitudinally extending beams 40 and 42, yokes 79 and 81 and locking means 84 and 86. However, in this embodiment, the base plates 66 and 72 and the corresponding fin systems 68 and 74 respectively are not included. Accordingly, the transport vehicle according to this embodiment provides less heat transfer capabilities than the basic embodiment of the invention shown in FIGS. 1 to 6. However, the vehicle of this embodiment still protects the container in the same way as the basic embodiment of the invention. Consequently, even without the fin assemblies employed on the preferred embodiment of the present invention, the overall weight of payload per pound of the container/transport assembly of this embodiment is far greater than prior art combinations. Moreover, if desired, a different heat transfer system could be attached to the container borne by the vehicle of this embodiment to provide the desired heat transfer.

Figure 8:
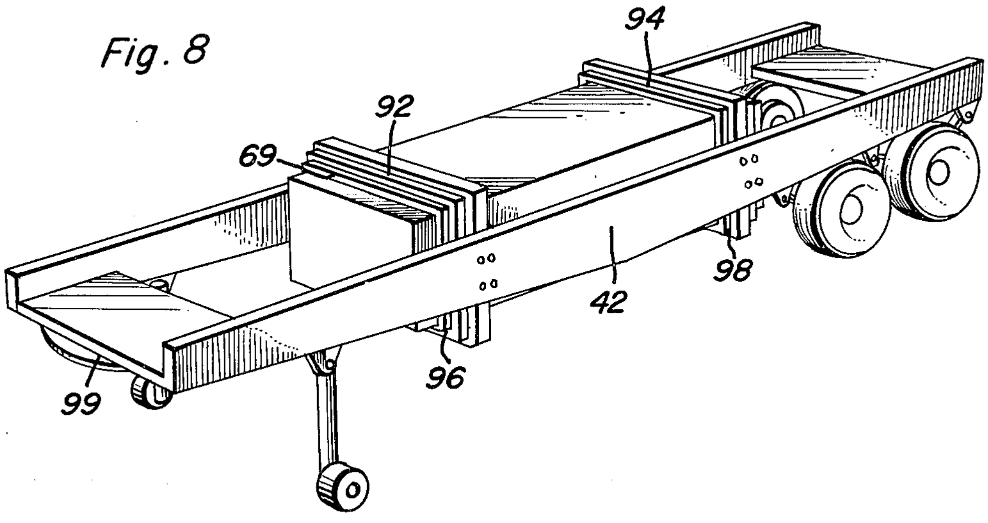
FIG. 8 illustrates a further embodiment of the inventive vehicle assembly.

It should also be appreciated that while only a few specific embodiments of the inventive container/transport assembly have been illustrated above, many different modifications of the specific disclosed design can be made without departing from the spirit and the scope of the invention disclosed herein. For example, the particularly described means for securing the container to the longitudinal beams 40 and 42, that is the vertical support members 54, 56, 58 and 60, the horizontal members 62 and 64 and locking arms 76 and 78, can be replaced by any structure serving to fixedly secure the container between the elongated beams 40 and 42. In particular, it is contemplated according to the present invention that U-shaped locking collars may be employed instead of these members, two U-shaped members serving as the horizontal support on which the container rests, and two more U-shaped members serving to lock the container onto the remainder of the assembly. In this regard, note FIG. 8 in which is illustrated a vehicle according to the present invention which is constructed much in the same manner as the vehicle of FIG. 7 but employs U-shaped members 92, 94, 96 and 98, which are welded onto beams 40 and 42, and which are bolted together to securely hold the container in place.

It should also be appreciated that the inventive transportation vehicle can be provided with other transverse structural members for separating longitudinal beams 40 and 42 aside from the horizontal yokes 62 and 64 and the horizontal locking members 76 and 78. However, if the yoke and locking members are made strong enough, such additional supports are not necessary.

Still other modifications of the specifically described structure are contemplated within the scope of the present invention. For example, suitable stops can be attached to the inventive vehicle instead of the container to prevent forward and rearward movement of the container with respect to the vehicle. Moreover, it is also contemplated that the inventive transportation vehicle can be used as the trailer portion of a conventional tractor-trailer. When so employed, the forward wheel carriage assembly 46 and the forward wheels 48, of course, can be replaced by a conventional tractor-trailer coupling assembly such as the coupler generally indicated at 99 in FIG. 11. Moreover, it is still further contemplated that the container 70 shown in FIGS. 4 to 11 could be provided with a jacket of a neutron absorbing material, such as, for example, a jacket of borated water, if desired. Such a jacket, if provided, would preferably be attached to the outer walls of container 70 and would longitudinally extend between yoke 79 and 81.

Finally, it should also be appreciated that the container employed in combination with the inventive transport vehicle need not have smooth walls as in the embodiment specifically described above. On the contrary, the container can have any shape and configuration and can be provided with any type of heat exchanger means, if desired, so long as it can be rigidly secured with the structure of the inventive transport vehicle in such a way that the vehicle structure itself, when acting through the center of gravity of the whole assembly, always strikes the ground first when a container/transport assemlby is subject to impact.

The foregoing description and the drawings included herewith have been presented for illustrative purposes only and are not intended to limit the invention in any way. All reasonable modifications not specifically set forth are intended to be included within the present invention, which is to be limited only by the following claims:

What is claimed is:

1. A vehicle for transporting and protecting a container from injury which comprises:

a. a pair of longitudinally extending, spaced apart beams for receiving said container therebetween having ends extending beyond the ends of said container, said longitudinal beams having a cross-section greater in the vertical than in the horizontal direction;

b. a pair of end beams interconnecting and adjacent each end of said longitudinal beams, said end beams having a cross-section greater in the horizontal than in the vertical direction;

c. at least two longitudinally spaced apart yoke means rigidly interconnecting said longitudinal beams and positioned therebetween, each said yoke means comprising at least two vertical supports attached directly to one of said beams, said yoke means further comprising at least two horizontal supports interconnecting and attached to said at least two vertical supports at each end, said yoke means extending above and below said longitudinal beams;

d. said container supported and secured by said yoke means and said longitudinal beams such that said container is prevented from contacting a surface on which said vehicle is supported regardless of its position with respect to said surface; and e. at least one wheel for allowing said vehicle to be transported.

2. Apparatus according to claim 1, wherein said yoke means extends transversely across the top and bottom of said container.

3. Apparatus according to claim 1, wherein said yoke means is in surrounding relationship with said container.

4. Apparatus according to claim 1, wherein one of said at least two horizontal supports comprise a locking arm for releasably connecting the horizontal support to said vertical support.

5. Apparatus according to claim 1, wherein said yoke means comprises a pair of U-shaped members fixedly, rigidly and removably attached to said beams.

6. Apparatus according to claim 1, wherein said yoke means is positioned said longitudinal beams such that said container secured in said yoke means is paritally above and partially below said longitudinal beams.

7. Apparatus according to claim 1 wherein said container is adapted to contain a material which generated heat and said yoke means includes heat conducting means in thermal contact with said container for transfering heat generated within said container to the atmosphere.

8. Apparatus according to claim 7 wherein said heat exchange means is a system of fins.

9. Apparatus according to claim 8 wherein said container has smooth walls; and wherein said yoke means includes a system of plates defining the space for receiving said container, said system of plates being in intimate thermal contact with said smooth walls when said container is in said vehicle, said fin assembly being mounted on said system of plates.

10. Apparatus according to claim 9 wherein said yoke means and said plates define a generally trough-shaped space for receiving said container; said apparatus further comprising locking means for locking said container in said trough-shaped space.

11. Apparatus according to claim 10 wherein said locking means includes a fin system adapted to be in intimate thermal contact with such container for transferring heat generated in said container to the atmosphere.

12. A vehicle for transporting and protecting a container from injury which comprises:

a. pair of longitudinally extending, spaced apart solid beams for receiving said container therebetween having ends extending beyond the ends of said container, said longitudinal beams having a cross-section greater in the vertical than in the horizontal direction;

b. a pair of solid end beams interconnecting and adjacent each end of said longitudinal beams, said end beams having a cross-section greater in the horizontal than in the vertical direction;

c. at least two longitudinally spaced apart yoke means rigidly interconnecting said longitudinal beams and positioned therebetween, each said yoke means attached directly to said longitudinal beams an in contact therewith over the vertical extent of said longitudinal beams, each said yoke means extending above and below said longitudinal beams;

d. said container supported and secured by said yoke means and said longitudinal beams such that said container is prevented from contacting a surface on which said vehicle is supported regardless of its position with respect to said surface by said longitudinal beams and said yoke means; and e. at least two wheel assemblies positioned between said end beams for allowing said vehicle to be transported.

* * * * *